United States Patent
Chen et al.

(10) Patent No.: US 8,345,620 B2
(45) Date of Patent: Jan. 1, 2013

(54) METHOD AND APPARATUS FOR FREQUENCY HOPPING WITH FREQUENCY FRACTION REUSE

(75) Inventors: Wanshi Chen, San Diego, CA (US); Durga Prasad Malladi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1128 days.

(21) Appl. No.: 12/025,174

(22) Filed: Feb. 4, 2008

(65) Prior Publication Data

US 2008/0212520 A1 Sep. 4, 2008

Related U.S. Application Data

(60) Provisional application No. 60/888,890, filed on Feb. 8, 2007.

(51) Int. Cl.
*H04W 4/00* (2009.01)

(52) U.S. Cl. .............. 370/330; 455/403; 455/422.1; 455/450

(58) Field of Classification Search .......... 370/310–350; 375/130–153; 455/403–466
See application file for complete search history.

(56) References Cited

U.S. PATENT DOCUMENTS

| 7,257,406 B2 | 8/2007 | Ji |
| 7,548,752 B2 | 6/2009 | Sampath |
| 2005/0096062 A1* | 5/2005 | Ji et al. ................. 455/450 |
| 2005/0271012 A1* | 12/2005 | Agrawal et al. ............ 370/331 |
| 2006/0002360 A1 | 1/2006 | Ji |
| 2006/0135169 A1* | 6/2006 | Sampath et al. ........... 455/447 |
| 2006/0234752 A1 | 10/2006 | Mese et al. |
| 2008/0013599 A1* | 1/2008 | Malladi .................. 375/132 |

FOREIGN PATENT DOCUMENTS

| EP | 1043861 | 10/2000 |
| JP | 2006287664 A | 10/2006 |
| JP | 2006524969 A | 11/2006 |
| RU | 2125344 | 1/1999 |
| RU | 2248672 C2 | 3/2005 |
| WO | 2005043948 | 5/2005 |
| WO | WO2005122628 | 12/2005 |
| WO | 2006102744 | 10/2006 |
| WO | WO2006125203 A1 | 11/2006 |

OTHER PUBLICATIONS international Search Report—PCT/US08/053213—International Search Authority, European Patent Office—Oct. 17, 2008.
Written Opinion—PCT/US08/053213—International Search Authority, European Patent Office—Oct. 17, 2008.
"Description and simulations of interference management technique for OFDMA based E-UTRA downlink evaluation", 3GPP TSG-RAN WG1 #42, R1-050896, Aug. 29-Sep. 2, 2005, London, United Kingdom.
Taiwan Search Report—TW097104922—TIPO—Aug. 26, 2011.

* cited by examiner

*Primary Examiner* — Charles C Jiang
(74) *Attorney, Agent, or Firm* — Eric Ho; Ashish L. Patel

(57) ABSTRACT

A method and apparatus for a wireless communication system, for frequency hopping using frequency fraction reuse scheme. The frequency hopping pattern is generated by dividing a portion of frequency into plurality of sub-bands, dividing a portion of time into plurality of sectors, each sector comprising the divided sub-bands, designating one of the divided sub-band within one of the sectors as the restricted sub-band, and allocating a location the designated sub-band as a restricted sub-band.

25 Claims, 11 Drawing Sheets

METHOD AND APPARATUS FOR FREQUENCY HOPPING WITH FREQUENCY FRACTION REUSE

CROSS-REFERENCE TO RELATED APPLICATIONS

This application claims the benefit of U.S. Provisional Patent application Ser. No. 60/888,890 entitled "A Method and Apparatus for Frequency Hopping with FFR" which was filed Feb. 8, 2007. The entirety of the aforementioned applications is herein incorporated by reference.

BACKGROUND

I. Field

The following description relates generally to wireless communications, and more particularly to providing a mechanism for frequency fraction reuse to receive and transmit data using a transmission pattern.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, 3GPP LTE systems, orthogonal frequency division multiplexing (OFDM), localized frequency division multiplexing (LFDM), orthogonal frequency division multiple access (OFDMA) systems, and the like.

In a wireless communication system, a Node B (or base station) may transmit data to a user equipment (UE) on the downlink and/or receive data from the UE on the uplink. The downlink (or forward link) refers to the communication link from the Node B to the UE, and the uplink (or reverse link) refers to the communication link from the UE to the Node B. The Node B may also send control information (e.g., assignments of system resources) to the UE. Similarly, the UE may send control information to the Node B to support data transmission on the downlink and/or for other purposes.

In state of art systems, a hybrid automatic retransmission (HARQ) process is employed to improve reliability of data transmission (e.g. data packets or data assignment packets). In the system using HARQ process, the transmitter transmits data packets to a receiver and the receiver transmits acknowledgement (ACK if the data packets are processed successfully or NAK if the data packets are not processed successfully) in response. After the transmitter transmits the data packet, the transmitter awaits for reception of the ACK/NAK for a preset period of time before automatically retransmitting the data packet. If transmitter receives the ACK before the timer expires, the transmitter ends the HARQ process and begins another one, if any. If transmitter receives the NAK or the timer expires, the transmitter sets up another HARQ process and retransmits the data packet. However, if the ACK was transmitted by the receiver, but the transmitter was not able process it or did not receive the ACK before the time expired or the ACK/NAK transmissions are not reliable, the transmitter sets up another HARQ process and retransmits the data packet. This is very inefficient and causes delays in delivery of data. Thus, it is desirable to improve the reliability of ACK/NAK transmissions using an ACK/NAK repetition scheme, using an efficient transmission pattern in frequency and time to transmit ACK/NAK in order to improve system performance.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with an aspect, a method for a wireless communication system, dividing a portion of frequency into plurality of sub-bands, dividing a portion of time into plurality of sectors, each sector comprising the divided sub-bands, designating one of the divided sub-band within one of the sectors as the restricted sub-band, and allocating a location the designated sub-band as a restricted sub-band.

An aspect relates to an apparatus operable in a wireless communication, the apparatus comprising: means for dividing a portion of frequency into plurality of sub-bands; means for dividing a portion of time into plurality of sectors, each sector comprising the divided sub-bands; means for designating one of the divided sub-band within one of the sectors as the restricted sub-band; and means for allocating a location the designated sub-band as a restricted sub-band.

Another aspect relates to a computer program product, comprising: a computer-readable medium comprising: code for dividing a portion of frequency into plurality of sub-bands; code for dividing a portion of time into plurality of sectors, each sector comprising the divided sub-bands; code for designating one of the divided sub-band within one of the sectors as the restricted sub-band; and code for allocating a location the designated sub-band as a restricted sub-band.

Yet another aspect provides for an apparatus operable in a wireless communication, the apparatus comprising: at least one processor configured to divide a portion of frequency into plurality of sub-bands; divide a portion of time into plurality of sectors, each sector comprising the divided sub-bands; designate one of the divided sub-band within one of the sectors as the restricted sub-band; and allocate a location of designated sub-band as a restricted sub-band.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
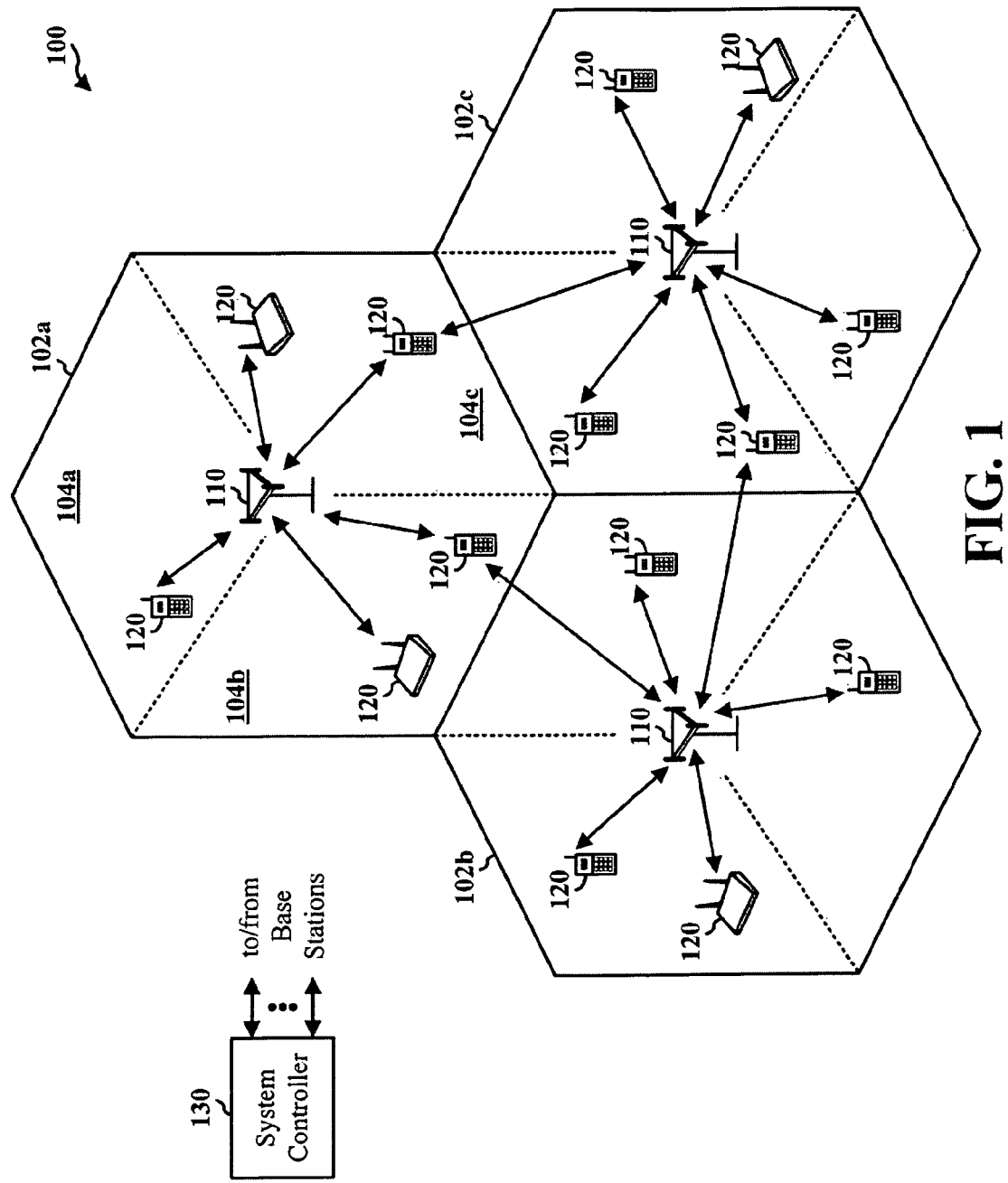
FIG. 1 illustrates a wireless communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

In addition, various aspects of the disclosure are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are descried in the context of an ad-hoc or unplanned/semi-planned deployed wireless communication environment that provides repeating ACK channel in an orthogonal system. One skilled in the art should appreciate that similar techniques could apply to other communication environments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a subscriber station. A subscriber station can also be called a system, a subscriber unit, mobile station, mobile, remote station, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc; UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for uplink transmission in LTE, and 3GPP terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

LTE utilizes orthogonal frequency division multiplexing (OFDM) on the downlink and single-carrier frequency division multiplexing (SC-FDM) on the uplink. OFDM and SC-FDM partition the system bandwidth into multiple (N) orthogonal subcarriers, which are also commonly referred to as tones, bins, etc. Each subcarrier may be modulated with data. In general, modulation symbols are sent in the frequency domain with OFDM and in the time domain with SC-FDM. For LTE, the spacing between adjacent subcarriers may be fixed, and the total number of subcarriers (N) may be dependent on the system bandwidth. In one design, N=512 for a system bandwidth of 5 MHz, N=1024 for a system bandwidth of 10 MHz, and N=2048 for a system bandwidth of 20 MHz. In general, N may be any integer value.

FIG. 1 illustrates a wireless communication system 100 with multiple base stations 110 and multiple terminals 120, such as may be utilized in conjunction with one or more aspects. A base station is generally a fixed station that communicates with the terminals and may also be called an access point, a Node B, or some other terminology. Each base station 110 provides communication coverage for a particular geographic area, illustrated as three geographic areas, labeled 102a, 102b, and 102c. The term "cell" can refer to a base station and/or its coverage area depending on the context in which the term is used. To improve system capacity, a base station coverage area may be partitioned into multiple smaller areas (e.g., three smaller areas, according to cell 102a in FIG. 1), 104a, 104b, and 104c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal may be fixed or mobile. A terminal may also be called a mobile station, user equipment, a user device, or some other terminology. A terminal may be a wireless device, a cellular phone, a personal digital assistant (PDA), a wireless modem card, and so on. Each terminal 120 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points.

Figure 2:
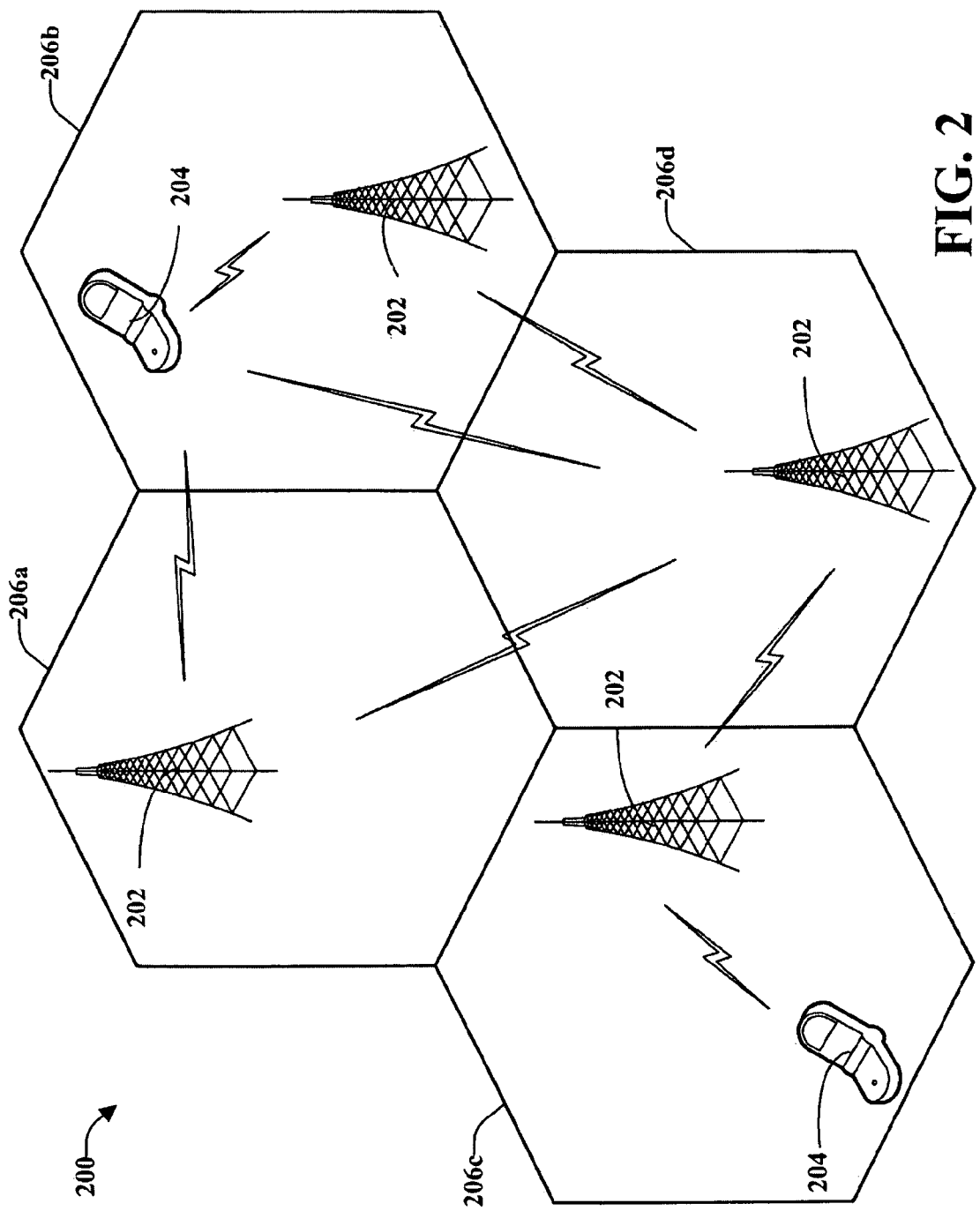
FIG. 2 depicts an example communications apparatus for employment with a wireless communications environment.

FIG. 2 is an illustration of an ad hoc or unplanned/semi-planned wireless communication environment 200, in accordance with various aspects. System 200 can comprise one or more base stations 202 in one or more sectors that receive, transmit, repeat, etc., wireless communication signals to each other and/or to one or more mobile devices 204. As illustrated, each base station 202 can provide communication coverage for a particular geographic area, illustrated as three geographic areas, labeled 206a, 206b, 206c and 206d. Each base station 202 can comprise a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Mobile devices 204 may be, for example, cellular phones, smart phones, laptops, handheld communication devices, handheld computing devices, satellite radios, global positioning systems, PDAs, and/or any other suitable device for communicating over wireless network 200. System 200 can be employed in conjunction with various aspects described herein in order to a flexible pilot pattern.

The transmission techniques described herein may be used for various wireless communication systems such as CDMA, TDMA, FDMA, OFDMA, and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (W-CDMA) and Low Chip Rate (LCR). cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), IEEE 802.11, IEEE 802.16, IEEE 802.20, Flash-OFDM®, etc. These various radio technologies and standards are known in the art. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for uplink transmission in LTE, and 3GPP terminology is used in much of the description below.

LTE utilizes orthogonal frequency division multiplexing (OFDM) on the downlink and single-carrier frequency division multiplexing (SC-FDM) on the uplink. OFDM and SC-FDM partition the system bandwidth into multiple (N) orthogonal subcarriers, which are also commonly referred to as tones, bins, etc. Each subcarrier may be modulated with data. In general, modulation symbols are sent in the frequency domain with OFDM and in the time domain with SC-FDM. For LTE, the spacing between adjacent subcarriers may be fixed, and the total number of subcarriers (N) may be dependent on the system bandwidth. In one design, N=512 for a system bandwidth of 5 MHz, N=1024 for a system bandwidth of 10 MHz, and N=2048 for a system bandwidth of 20 MHz. In general, N may be any integer value.

The system may support a frequency division duplex (FDD) mode and/or a time division duplex (TDD) mode. In the FDD mode, separate frequency channels may be used for the downlink and uplink, and downlink transmissions and uplink transmissions may be sent concurrently on their separate frequency channels. In the TDD mode, a common frequency channel may be used for both the downlink and uplink, downlink transmissions may be sent in some time periods, and uplink transmissions may be sent in other time periods.

The LTE downlink transmission scheme is partitioned by radio frames (e.g. 10 ms radio frame). Each frame comprises a pattern made of frequency (e.g. sub-carrier) and time (e.g. OFDM symbols). The 10 ms radio frame is divided into plurality of adjacent 0.5 ms sub-frames (also referred to as sub-frames or timeslots and interchangeably used hereinafter). Each sub-frame comprises plurality of resource blocks, wherein each resource block made up of one or more subcarrier and one or more OFDM symbol. One or more resource blocks may be used for transmission of data, control information, pilot, or any combination thereof.

A hybrid automatic retransmission (HARQ) is employed to improve reliability of data transmission. For example, in most systems, the HARQ may employed for the physical downlink shared channel (PDSCH) or physical uplink shared channel (PUSCH), both of them simply referred to as shared data channel (SDCH), wherein the data packets are re-transmitted at L1 based on ACK/NAK transmitted from the UE using an acknowledgement channel (ACKCH). For HARQ on the downlink, the Node B may send a transmission for a packet and may send one or more retransmissions until the packet is decoded correctly by the UE, or the maximum number of retransmissions has been sent, or some other termination condition is encountered.

An HARQ process may refer to all transmission and retransmissions, if any, for a packet. An HARQ process may be started when resources are available and may terminate after the first transmission or after one or more subsequent retransmissions. An HARQ process may have a variable duration that may depend on the decoding results at the receiver. An HARQ process may be for a one UE or multiple UE operating in a system. Each HARQ process may be sent on one HARQ interlace. In an aspect, each HARQ process may be sent on one HARQ interlace (e.g. sub-frame, slot, resource block, etc.).

For example, when the resources and data are ready, the Node B transmits a data packet to UE. If the data packet is received by the UE, the UE may transmit an ACK if the data packet was successfully processed or send an NAK if the there was an error in decoding the data packet. In response, the Node B may retransmit the same packet if NAK was received or a timer expired before receiving any acknowledgement.

Figure 3:
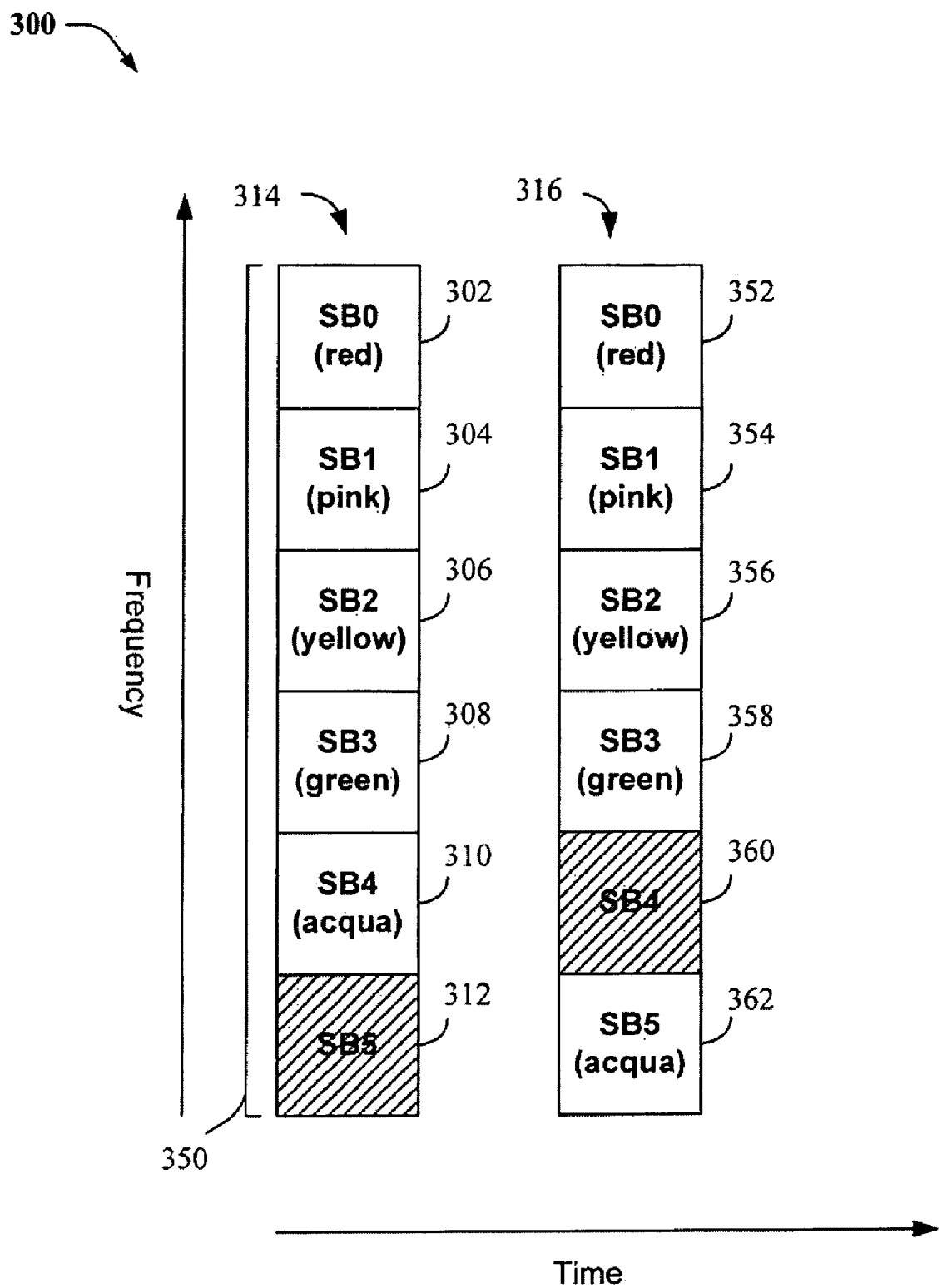
FIG. 3 illustrates an exemplary frequency patter.

FIG. 3 illustrates an exemplary frequency pattern 300. According to an example, the entire band 350 is divided into 6 sub-bands (SB0-SB05) for each sector. This example illustrates two sectors, sector 0 and sector 1, 314 and 316, in the system. Sub-band having the same color (for example, red for SB0 of 314 and SB0 or 316), have the same frequency planning. One out of 6 sub-bands comprises a restricted sub-band, where no or minimum (minimum may be determined by the operator as being below a preset threshold value) transmit power is allowed for traffic such that its interference to other sector colors is minimized. In this example, SB5 is the identified as restricted sub-band for sector 0, 314 and SB4 is the identified as restricted sub-band for sector 1, 316.

In a FDMA based system, there may be two scheduling techniques are employed, namely, sub-band scheduling and diversity scheduling. Sub-band scheduling limits the frequency occupancy in a contiguous narrow band to take advantage of frequency selectivity by the wireless channel, and thus is also known as frequency selective scheduling (FSS). Diversity scheduling, on the other hand, extends the occupancy to a large non-contiguous band to achieve both channel and interference diversity when fast channel feedback is not available or warranted, and thus is also known as frequency diversity scheduling (FDS). It often becomes necessary to multiplex FSS and FDS within the same entire available frequency bandwidth.

Figure 4:
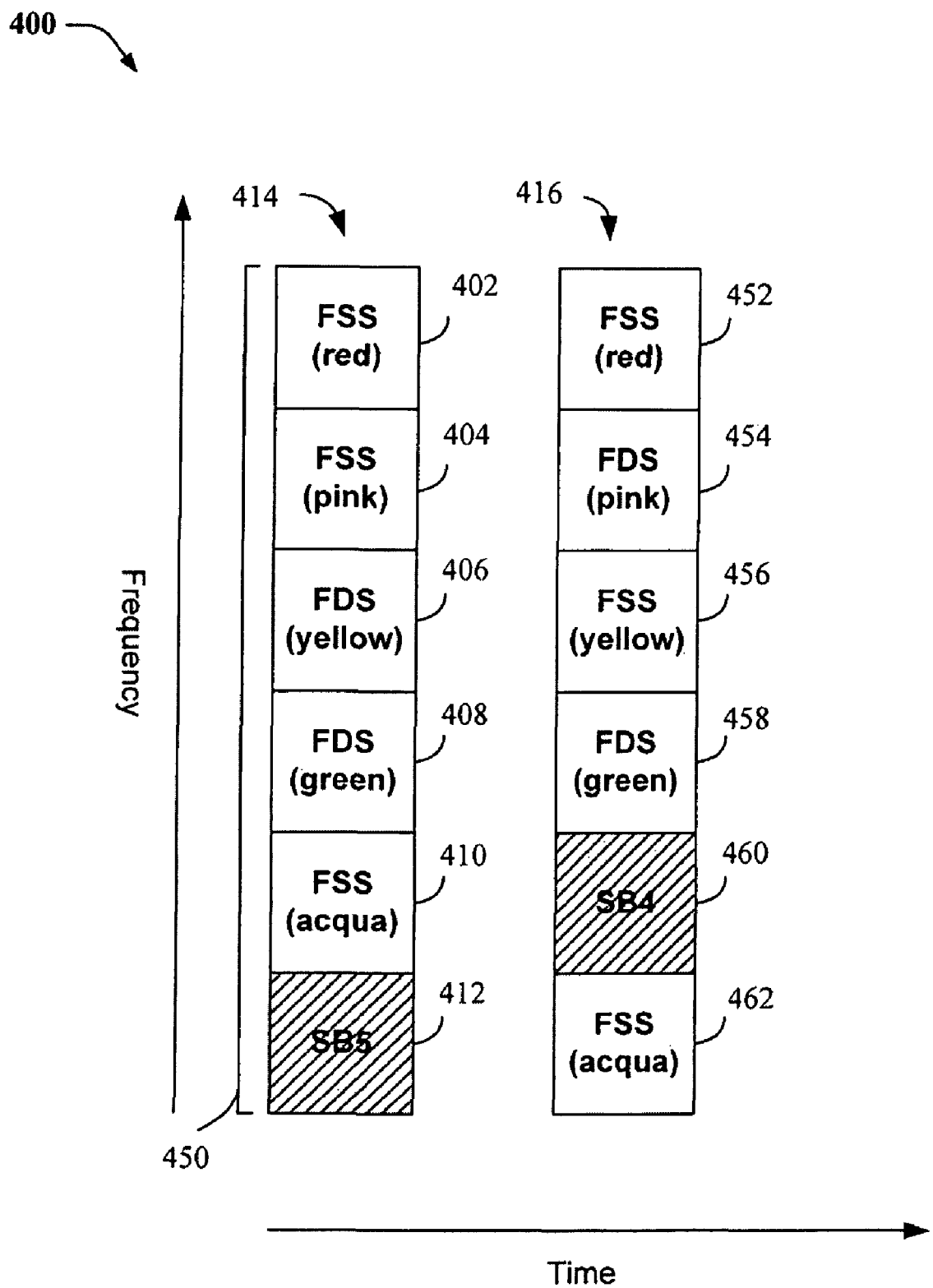
FIG. 4 illustrate an example a FDMA based system comprising FSS and FDS.

FIG. 4 illustrate an example a FDMA based system 400 comprising FSS and FDS (also, refer to as FHS). It should be notes that this is one example and that several permutations may be employed dynamically or statically. As shown in FIG. 1, entire band 450 is divided into six sub-bands and some of the five non-restricted sub-bands in each sector can be used for FSS, while the others for FDS. According to the example, sub-bands 402, 404, and 410 of sector 0, 414 are designated for FSS and sub-bands 452, 456, and 462 of sector 1, 416 are designated as FSS. Sub-bands 406, and 408 of sector 0, 414 are designated for FDS and sub-bands 454 and 458 of sector 1, 416 are designated as FDS. Sub-band SB5, 412 of sector 0, 414 and sub-band SB4, 460 of sector 1, 416 are designated as restricted. Within a transmission time interval (TTI), hopping can be done on a per sub-band level within FDS sub-bands, and on a per resource block level (a sub-band contains multiple resource blocks) or even a per tone level within each sub-band.

Figure 5:
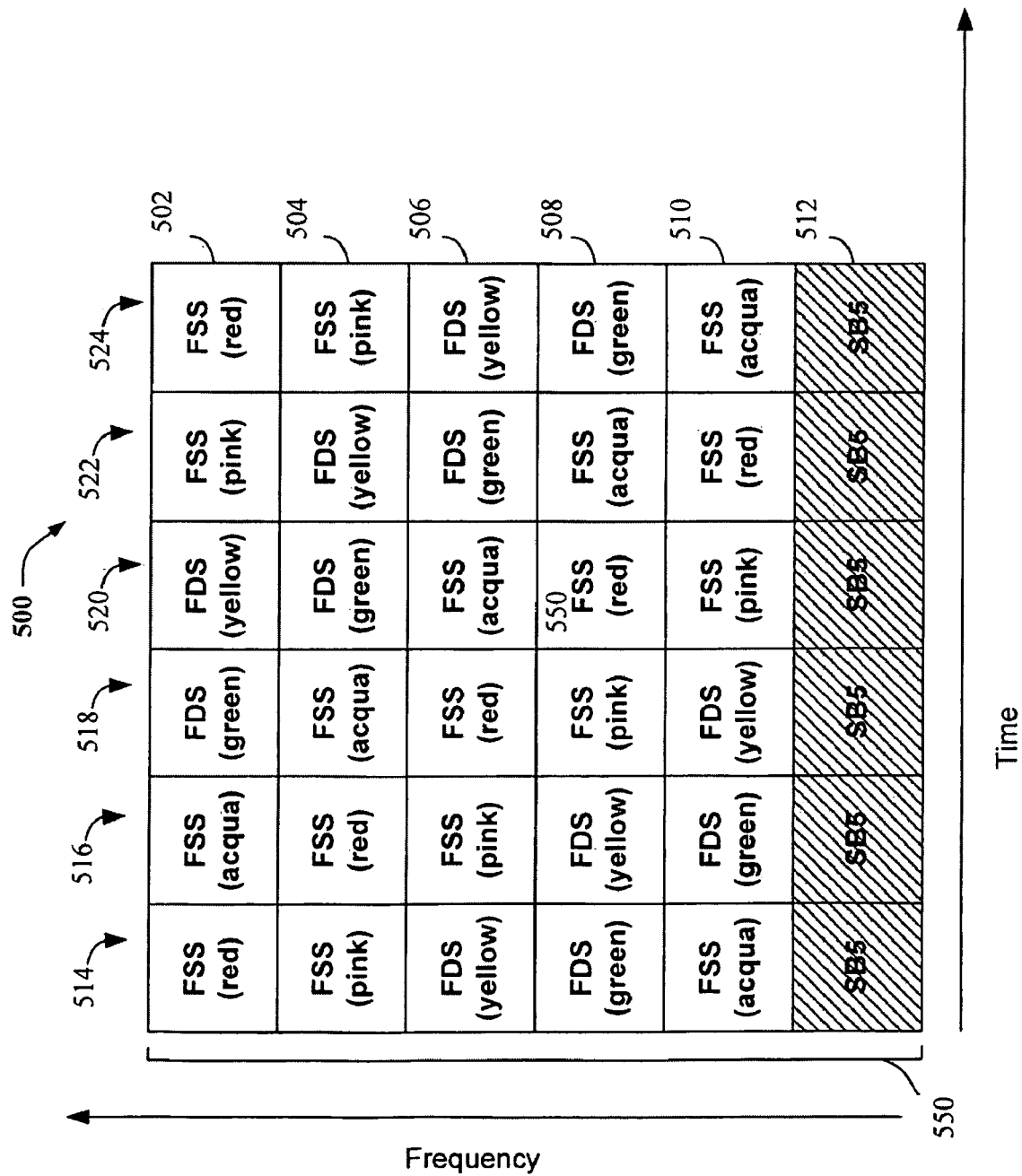
FIG. 5 illustrates frequency hopping across H-ARQ processes.

FIG. 5 illustrates frequency hopping across H-ARQ processes 500. As shown in FIG. 1, entire band 550 is divided into six sub-bands and some of the five non-restricted sub-bands in each sector can be used for FSS, while the others for FDS. As illustrated, frequency hopping can also be done on a per H-ARQ process level, such that the locations of sub-bands 502-510 of each instances may evolve across different H-ARQ instances 514-524. In this example, the restricted sub-band (SB5, 512 for each H-ARQ instance) in this case is not involved in the frequency hopping. This is due to the static frequency planning in FFR. This may causes some inefficiency in that this sub-band is never used by this sector, and hence the additional frequency selectivity offered by this sub-band is not utilized.

Figure 6:
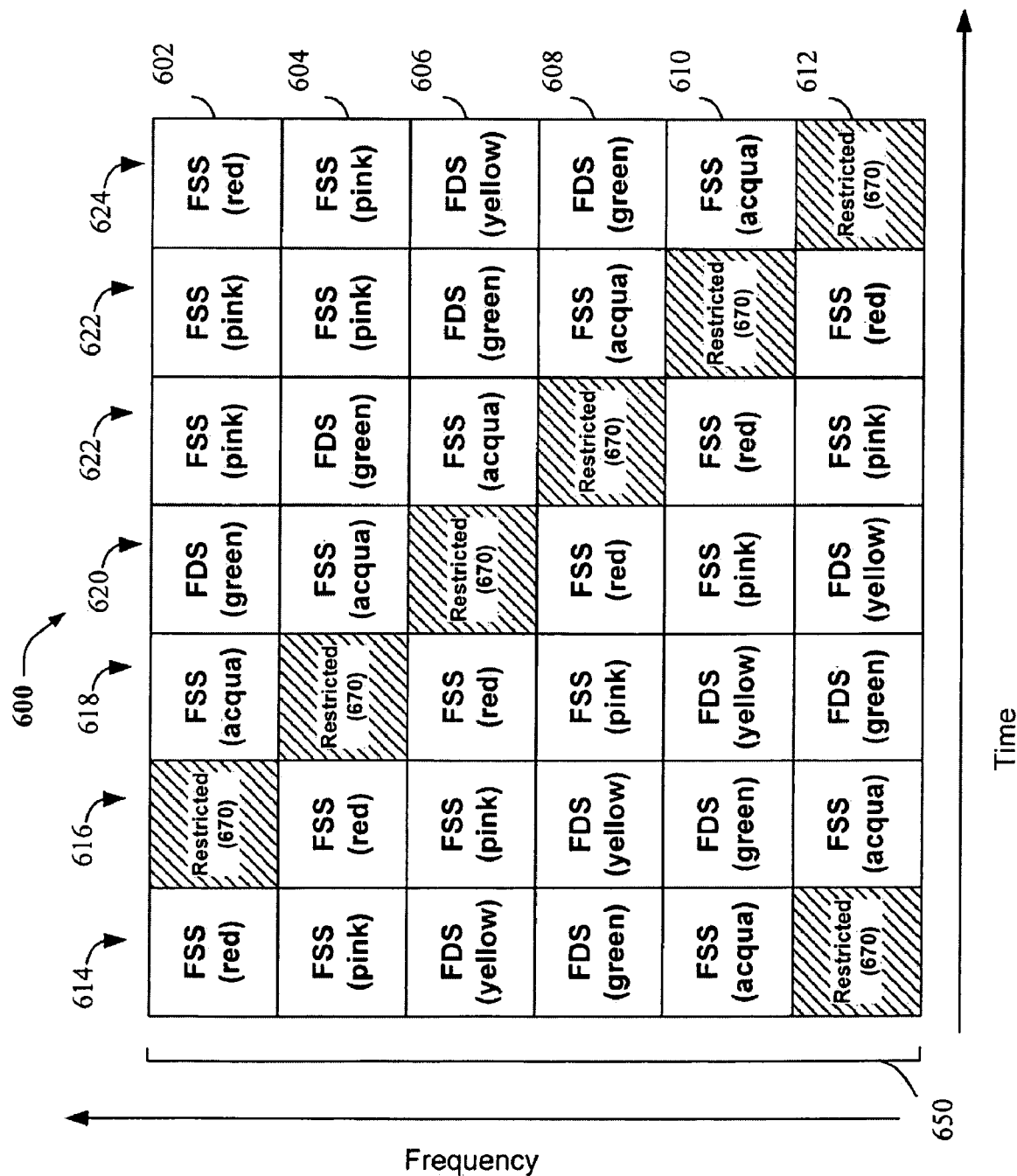
FIG. 6 illustrates frequency hopping pattern for H-ARQ processes.

FIG. 6 illustrates frequency hopping pattern 600 for H-ARQ processes. As shown in FIG. 1, entire band 650 is divided into six sub-bands and some of the five non-restricted sub-bands in each sector can be used for FSS, while the others for FDS. As illustrated, frequency hopping can also be done on a per H-ARQ process level, such that the locations of sub-bands 602-612 of each instances may evolve across different H-ARQ instances 614-624, including the restricted sub-band. According to an aspect, to dynamically re-locate the restricted sub-bands 670 in a cell and the relocation is done synchronously across different sectors such that the FFR frequency planning is maintained at any given time. This is illustrated the pattern using the cross-section. By relocating the restricted sub-band synchronously, the restricted sub-band is not physically fixed, but evolves with time, and may span the entire frequency bands. This is helpful especially for FSS, where the frequency selectivity can be exploited over the entire frequency band. The relocation of the restricted sub-bands need not be homogenous across all the sectors of a cell. Depending of traffic and channel conditions, some sectors may not relocate the restricted sub-band. Also, the sizes of the restricted sub-bands may not be the same across all cells as well and may vary from sector to sector based on a predetermined frequency plan. In addition, typically the UE is transparent to the FFR scheme and does not need to know the location of the restricted sub-bands. The virtual restricted sub-band scheme as illustrated above makes the FFR operations even more transparent to UEs, thereby maximizing frequency diversity and reducing interference. Thus, a frequency hopping scheme in combination with the FFR scheme, the scheme translates the physically restricted sub-bands in FFR to virtually restricted sub-bands and provides additional frequency selectivity.

Figure 7:
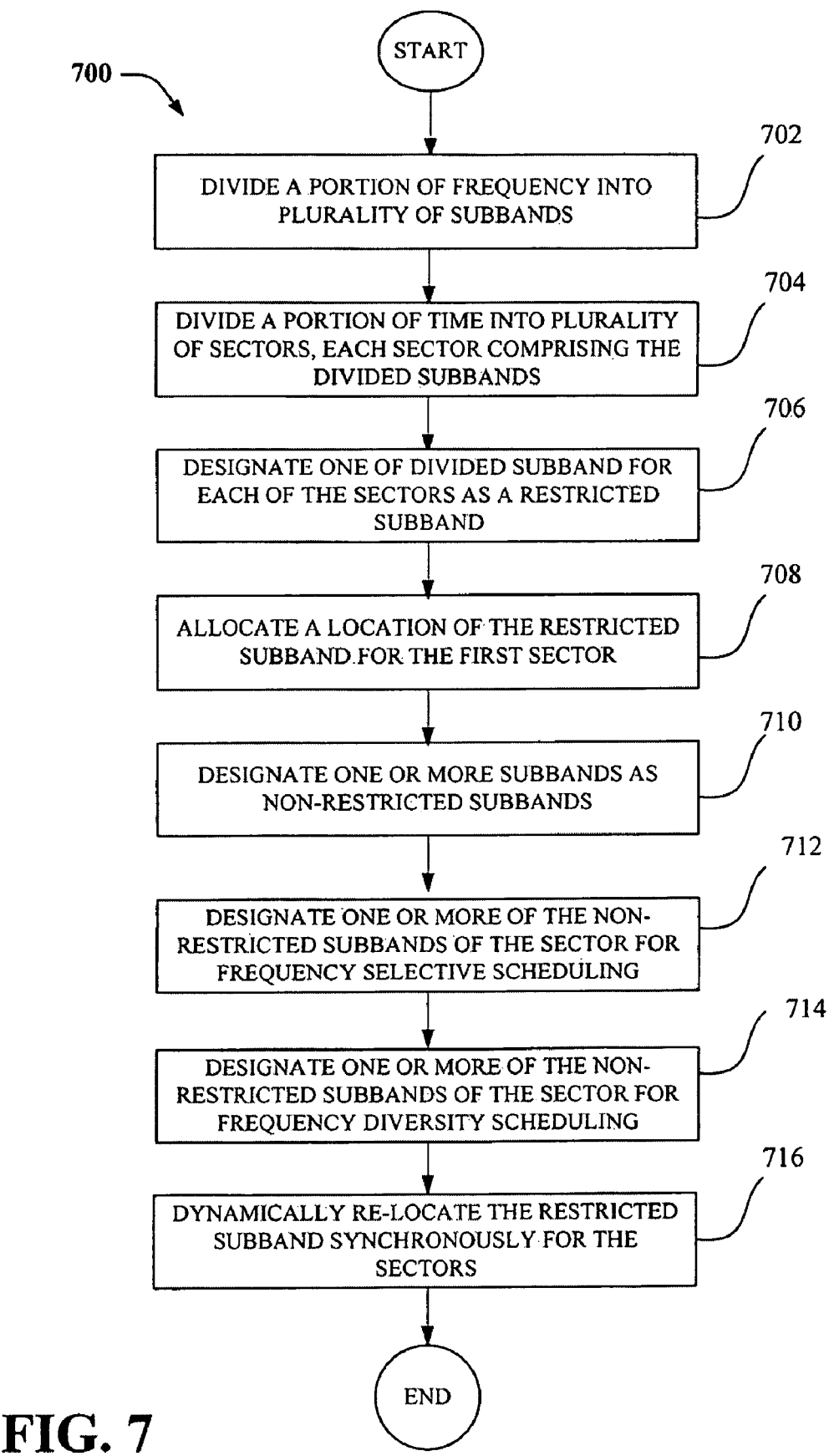
FIG. 7 illustrates a sample methodology for generating a frequency hopping pattern.

Referring to FIG. 7, methodologies relating a mechanism for generating a frequency hopping pattern according to an aspect. While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Turning specifically to FIG. 7, an example methodology 700 that facilitates generating a frequency hopping pattern in wireless communication system according to an aspect is illustrated. The method starts at 702, the method divides a portion of frequency into plurality of sub-bands, for example 602-612 in FIG. 6. The method at 704, divides a portion of time into plurality of sectors, each sector comprising the divided sub-bands, for example 614-624 in FIG. 6. The method at 706, designates one of divided sub-band for each of the sectors as a restricted sub-band. The method at 708, allocates a location of the restricted sub-band for the first sector. The method at 710, designates one or more sub-bands as non-restricted sub-bands. The method at 712, designates one or more of the non-restricted sub-bands of the sector for frequency selective scheduling. The method at 714, designates one or more of the non-restricted sub-bands of the sector for frequency diversity scheduling. The method at 716, dynamically re-locate the restricted sub-band synchronously for the sectors. Once the frequency map is generated, the scheduler may transmit the information about the frequency map to all the UE it serves.

Figure 8:
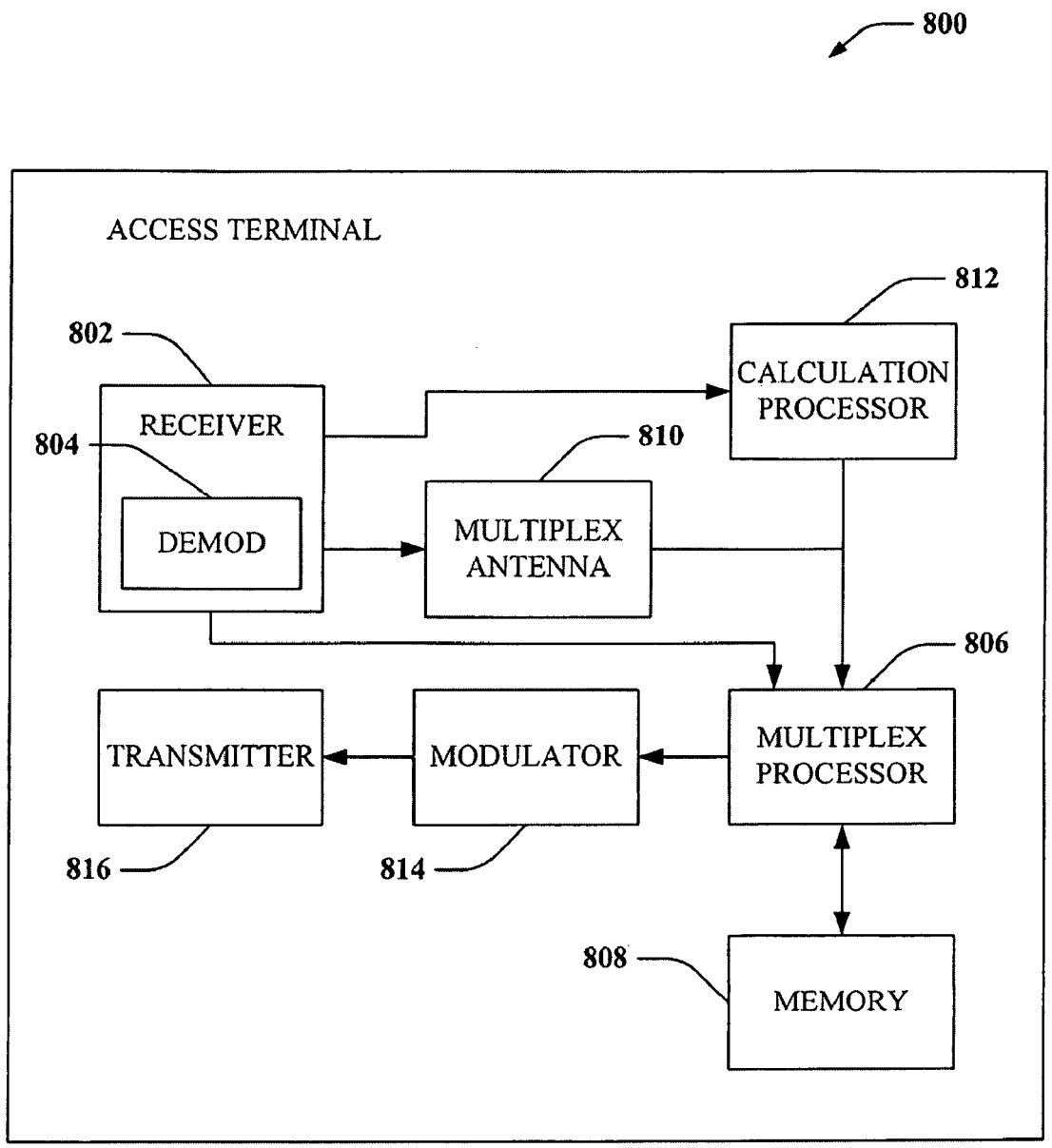
FIG. 8 depicts an exemplary access terminal that can provide feedback to communications networks.

FIG. 8 depicts an exemplary access terminal 800 that can provide feedback to communications networks, in accordance with one or more aspects. Access terminal 800 comprises a receiver 802 (e.g., an antenna) that receives a signal and performs typical actions on (e.g., filters, amplifies, down-converts, etc.) the received signal. Specifically, receiver 802 can also receive a service schedule defining services apportioned to one or more blocks of a transmission allocation period, a schedule correlating a block of downlink resources with a block of uplink resources for providing feedback information as described herein, or the like. Receiver 802 can comprise a demodulator 804 that can demodulate received symbols and provide them to a processor 806 for evaluation. Processor 806 can be a processor dedicated to analyzing information received by receiver 802 and/or generating information for transmission by a transmitter 816. Additionally, processor 806 can be a processor that controls one or more components of access terminal 800, and/or a processor that analyzes information received by receiver 802, generates information for transmission by transmitter 816, and controls one or more components of access terminal 800. Additionally, processor 806 can execute instructions for interpreting a correlation of uplink and downlink resources received by receiver 802, identifying un-received downlink block, or generating a feedback message, such as a bitmap, appropriate to signal such un-received block or blocks, or for analyzing a hash function to determine an appropriate uplink resource of a plurality of uplink resources, as described herein.

Access terminal 800 can additionally comprise memory 808 that is operatively coupled to processor 806 and that may store data to be transmitted, received, and the like. Memory 808 can store information related to downlink resource scheduling, protocols for evaluating the foregoing, protocols for identifying un-received portions of a transmission, for determining an indecipherable transmission, for transmitting a feedback message to an access point, and the like.

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Receiver 802 is further operatively coupled to multiplex antenna 810 that can receive a scheduled correlation between one or more additional blocks of downlink transmission resources and a block of uplink transmission resources (e.g., to facilitate providing multiple NACK or ACK messages in a bitmap response). A multiplex processor 806 can include a multi-digit bitmap within a feedback message that provides an ACK or NACK message indicating whether a first downlink block and each of one or more additional downlink blocks are received or un-received, over a single uplink resource. Further, a calculation processor 812 can receive a feedback probability function, wherein the function limits a probability that a feedback message is provided by access terminal 800, as described herein, if the block of downlink transmission resources, or data associated therewith, is not received. Specifically, such probability function can be employed to reduce interference if multiple devices are reporting lost data simultaneously.

Access terminal 800 still further comprises a modulator 814 and a transmitter 816 that transmits the signal to, for instance, a base station, an access point, another access terminal, a remote agent, etc. Although depicted as being separate from the processor 806, it is to be appreciated that signal generator 810 and indicator evaluator 812 may be part of processor 806 or a number of processors (not shown).

Figure 9:
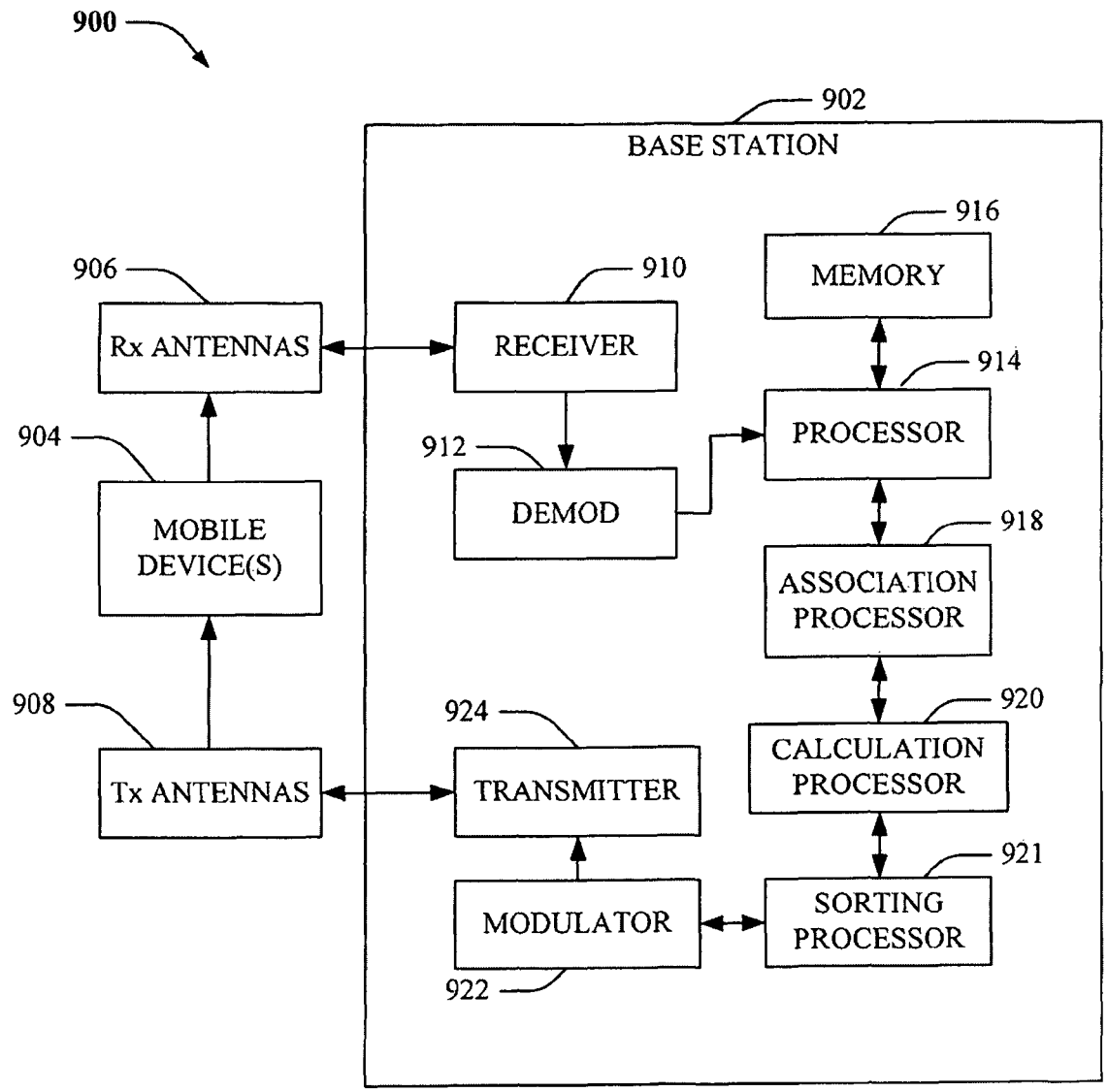
FIG. 9 illustrates an exemplary base station that can be employed in conjunction with a wireless networking environment disclosed herein.

FIG. 9 is an illustration of a system 900 that facilitates provision of feedback related to lost transmission data for an LTE network. System 900 comprises a base station 902 (e.g., access point, . . . ) with a receiver 910 that receives signal(s) from one or more mobile devices 904 through a plurality of receive antennas 906, and a transmitter 922 that transmits to the one or more mobile devices 904 through a transmit antenna 908. Receiver 910 can receive: information from receive antennas 906 and can further comprise a signal recipient (not shown) that receives feedback data related to an un-received or indecipherable data packet. Additionally, receiver 910 is operatively associated with a demodulator 912 that demodulates received information. Demodulated symbols are analyzed by a processor 914 that is coupled to a memory 916 that stores information related to correlating uplink and downlink resources, providing dynamic and/or static correlations from a network, as well as data to be transmitted to or received from mobile device(s) 904 (or a disparate base station (not shown)), and/or any other suitable information related to performing the various actions and functions set forth herein.

Processor 914 is further coupled to an association processor 918 that can schedule a correlation during an allocation period between a block of downlink transmission resources and a block of uplink transmission resources for a multicast or broadcast service. Additionally, association processor 918 can further schedule a correlation between one or more additional blocks of uplink transmission resources and the block of downlink transmission resources, to enable receipt of a plurality of feedback messages for the downlink resource. As a result, a relative number of feedback messages related to the downlink resource can be determined. Moreover, association processor 918 can schedule a correlation between a plurality of blocks of downlink transmission resources and an uplink transmission resource for a multicast or broadcast service, such that a single bitmap included within a feedback message can indicate ACK or NACK information for the plurality of blocks of downlink transmission resources.

Association processor 918 can be coupled to a calculation processor 920 that generates a probability factor, which can limit a likelihood that a terminal device will provide the feedback message. The probability factor can be employed by base station 902 to reduce feedback interference from multiple terminal devices. Additionally, calculation processor 920 can generate a hash function transmitted by base station 902 that can indicate to each of a plurality of terminal devices a particular uplink transmission resource to use in submitting a feedback message. The hash function indication can be based at least in part on an access class of each terminal device, a hash of each terminal identity, an identity of a service utilized by each terminal device, or block-specific information, or a combination thereof.

Additionally, calculation processor 920 can be coupled to a sorting processor 921 that can determine a number of received feedback messages related to the block of downlink transmission resources. For instance, if a block of downlink transmission resources is coupled with multiple uplink transmission resources (e.g., by association processor 918, as described above), two or more feedback messages can be received by base station 902 for the downlink resource. The sorting processor 921 can therefore identify what feedback messages correspond to the downlink block, which can indicate a retransmission priority for that downlink block. Furthermore, the sorting processor 921 can elect between retransmitting multiple blocks of downlink transmission resources based at least in part on the number of received feedback messages related to each block of downlink transmission resources.

Figure 10:
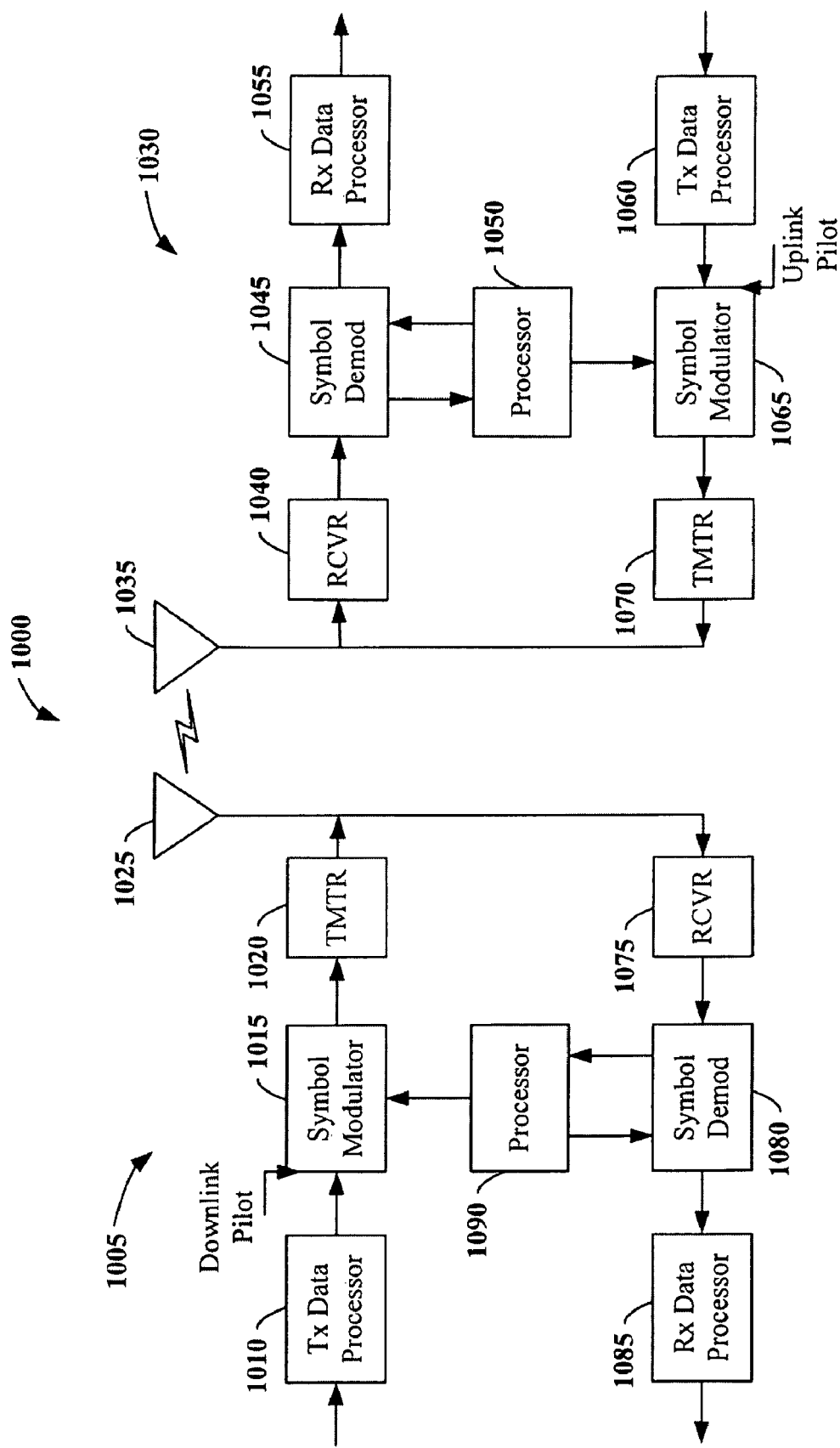
FIG. 10 illustrates a multiple access wireless communication system according to one embodiment.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1015 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency downconverts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol demaps), deinterleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

On the uplink, a TX data processor 1060 processes traffic data and provides data symbols. A symbol modulator 1065 receives and multiplexes the data symbols with pilot symbols, performs modulation, and provides a stream of symbols. A transmitter unit 1070 then receives and processes the stream of symbols to generate an uplink signal, which is transmitted by the antenna 1035 to the access point 1005.

At access point 1005, the uplink signal from terminal 1030 is received by the antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by terminal 1030. A processor 1090 performs channel estimation for each active terminal transmitting on the uplink. Multiple terminals may transmit pilot concurrently on the uplink on their respective assigned sets of pilot sub-bands, where the pilot sub-band sets may be interlaced.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot sub-bands may be shared among different terminals. The channel estimation techniques may be used in cases where the pilot sub-bands for each terminal span the entire operating band (possibly except for the band edges). Such a pilot sub-band structure would be desirable to obtain frequency diversity for each terminal. The techniques described herein may be implemented by various means. For example, these techniques may be implemented in hardware, software, or a combination thereof. For a hardware implementation, which may be digital, analog, or both digital and analog, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 11:
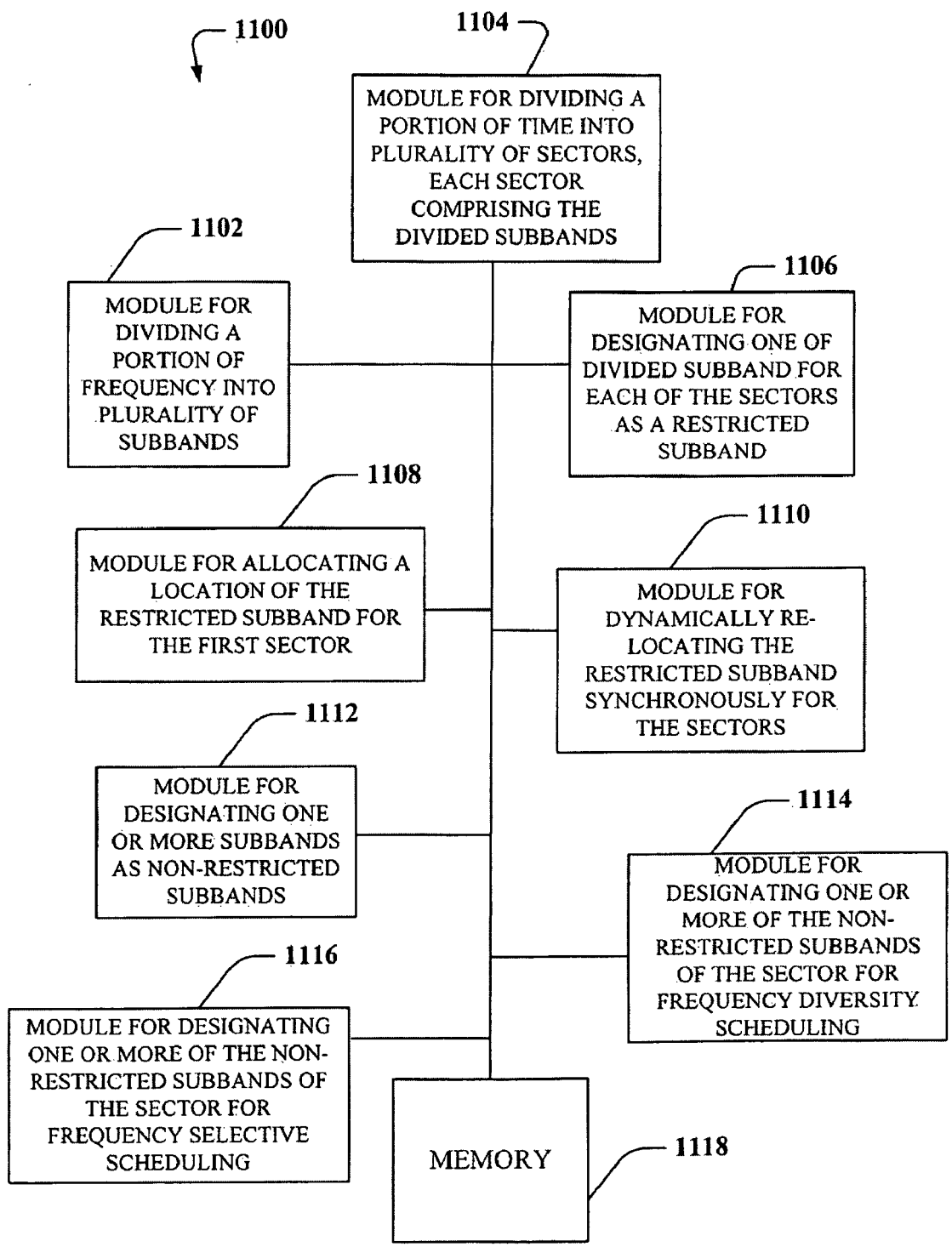
FIG. 11 depicts an exemplary system that facilities generating a frequency hopping pattern accordance with one or more aspects.

Referring now to FIG. 11, a system 1100 that facilitates generating a frequency hopping pattern in a wireless communication is illustrated. System 1100 may include a module 1102 for dividing a portion of frequency into plurality of sub-bands; a module 1104 for dividing a portion of time into plurality of sectors, each sector comprising the divided sub-bands; a module 1106 for designating one of divided sub-band for each of the sectors as a restricted sub-band; a module 1108 for allocating a location of the restricted sub-band for the first sector; a module 1110 for dynamically re-locating the restricted sub-band synchronously for the sectors; a module 1112 for designating one or more sub-bands as non-restricted sub-bands; a module 1114 for designating one or more of the non-restricted sub-bands of the sector for frequency selective scheduling; and a module 1116 for designating one or more of the non-restricted sub-bands of the sector for frequency diversity scheduling. Modules 1102-1116 may be a processor or any electronic device and may be coupled to memory module 1118.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method operable in a wireless communication system, the method comprising:
   dividing a portion of frequency into a plurality of sub-bands;
   dividing a portion of time into a plurality of sectors, each sector comprising the divided sub-bands;
   designating one of the divided sub-bands within one of the plurality of sectors as a restricted sub-band;
   allocating a location of the restricted sub-band; and
   dynamically and synchronously relocating, by a computer processor, the restricted sub-band for a sub-band of one or more subsequent sectors.

2. The method of claim 1, wherein designating one of the divided sub-band within one of the plurality of sectors as a restricted sub-band, comprises designating a sub-band wherein no transmit power is allowed and size of the restricted sub-band varies.

3. The method of claim 1, wherein designating one of the divided sub-band for each of the plurality of sectors as a restricted sub-band, comprises designating a sub-band wherein only transmit power below a threshold value is allowed.

4. The method of claim 1, further comprising designating one or more of the plurality of sub-bands for each of the plurality of sectors as non-restricted sub-bands.

5. The method of claim 4, further comprising designating the one or more of the plurality of sub-bands as non-restricted sub-bands of one sector for frequency selective scheduling.

6. The method of claim 4, further comprising designating the one or more of the plurality of sub-bands as non-restricted sub-bands of one sector for frequency diversity scheduling.

7. The method of claim 1, further comprising designating one or more of the plurality of sub-bands for each of the plurality of sectors as non-restricted sub-bands.

8. The method of claim 7, further comprising designating the one or more of the plurality of sub-bands as non-restricted sub-bands of one sector for frequency selective scheduling.

9. The method of claim 7, further comprising designating the one or more of the plurality of sub-bands as non-restricted sub-bands of one sector for frequency diversity scheduling.

10. The method of claim 1, wherein re-locating the restricted sub-band comprises using different size for the restricted sub-band for the subsequent sectors.

11. A non-transitory computer-readable medium comprising:
code for dividing a portion of frequency into a plurality of sub-bands;
code for dividing a portion of time into a plurality of sectors, each sector comprising the divided sub-bands;
code for designating one of the divided sub-bands within one of the plurality of sectors as a restricted sub-band;
code for allocating a location of the restricted sub-band; and
code for dynamically and synchronously relocating the restricted sub-band for a sub-band of one or more subsequent sectors.

12. The non-transitory computer-readable medium of claim 11, further comprising code for designating one or more of the plurality of sub-bands for each of the plurality of sectors as non-restricted sub-bands.

13. The non-transitory computer-readable medium of claim 12, further comprising code for designating the one or more of the plurality of sub-bands as non-restricted sub-bands of one sector for frequency selective scheduling.

14. The non-transitory computer-readable medium of claim 12, further comprising code for designating the one or more of the plurality of sub-bands as non-restricted sub-bands of one sector for frequency diversity scheduling.

15. The non-transitory computer-readable medium of claim 11, wherein the size of the restricted sub-band varies from the subsequent sectors.

16. An apparatus for producing a transmission pattern in frequency and time in a wireless communication system, the apparatus comprising:
at least one processor configured to:
divide a portion of frequency into a plurality of sub-bands;
divide a portion of time into a plurality of sectors, each sector comprising the divided sub-bands;
designate one of the divided sub-bands within one of the plurality of sectors as a restricted sub-band;
allocate a location of the restricted sub-band; and
dynamically and synchronously relocate the restricted sub-band for a sub-band of one or more subsequent sectors.

17. The apparatus of claim 16, wherein the at least one processor is further configured to designate one of the divided sub-bands within one of the plurality of sectors as a restricted sub-band, comprising designating a sub-band wherein no transmit power is allowed.

18. The apparatus of claim 16, wherein the at least one processor is further configured to designate one of the divided sub-bands within one of the plurality of sectors as a restricted sub-band, comprising designating a sub-band wherein only transmit power below a threshold value is allowed.

19. The apparatus of claim 16, wherein the at least one processor is further configured to designate one or more of the plurality of sub-bands for each of the plurality of sectors as non-restricted sub-bands.

20. The apparatus of claim 19, wherein the at least one processor is further configured to designate the one or more of the plurality of sub-bands as non-restricted sub-bands of one sector for frequency selective scheduling.

21. The apparatus of claim 19, wherein the at least one processor is further configured to designate the one or more of the plurality of sub-bands as non-restricted sub-bands of one sector for frequency diversity scheduling.

22. The apparatus of claim 16, wherein the at least one processor is further configured to designate one or more of the plurality of sub-bands for each of the plurality of sectors as non-restricted sub-bands.

23. The apparatus of claim 22, wherein the at least one processor is further configured to designate the one or more of the plurality of sub-bands as non-restricted sub-bands of one sector for frequency selective scheduling.

24. The apparatus of claim 22, wherein the at least one processor is further configured to designate the one or more of the plurality of sub-bands as non-restricted sub-bands of one sector for frequency diversity scheduling.

25. The apparatus of claim 16, wherein the size of the restricted sub-band varies from sector to sector.

* * * * *